C. T. SETTLE.
Grain Drill.
No. 31,564.
2 Sheets—Sheet 1.
Patented Feb. 26, 1861.
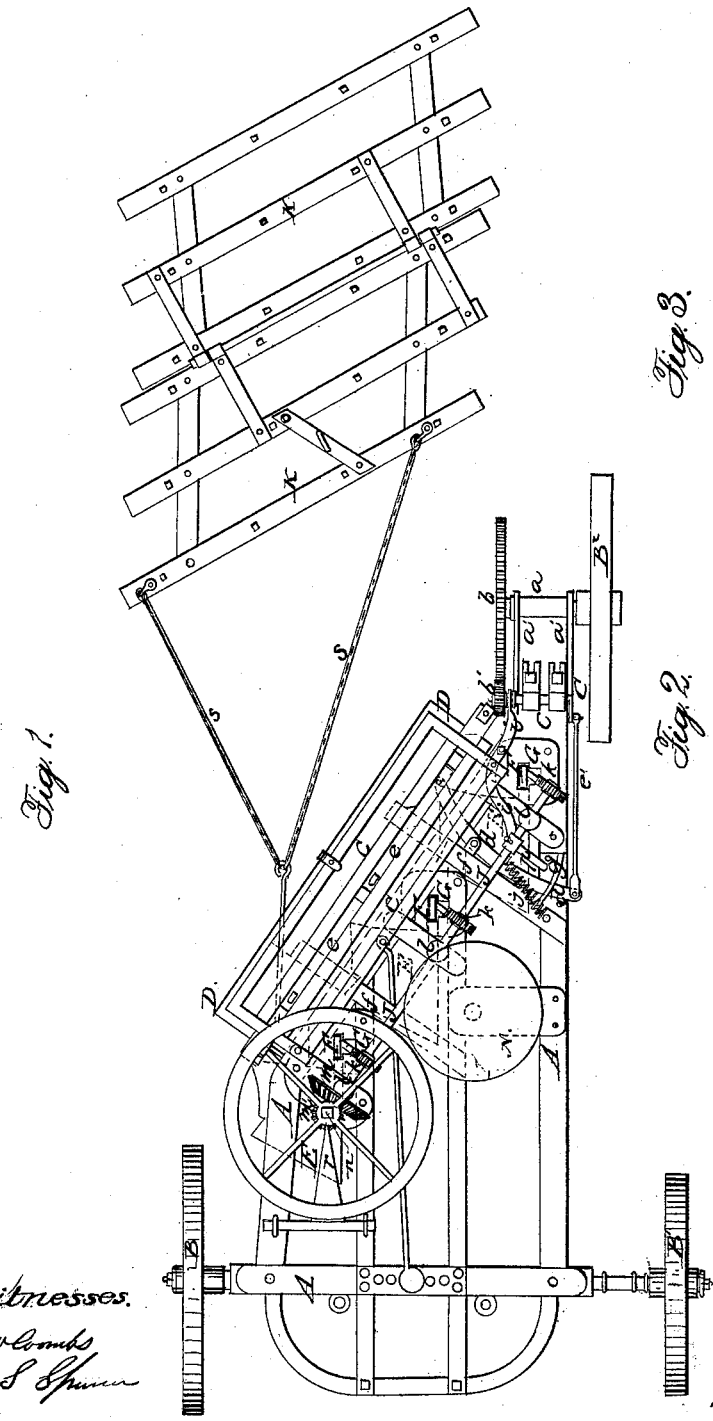

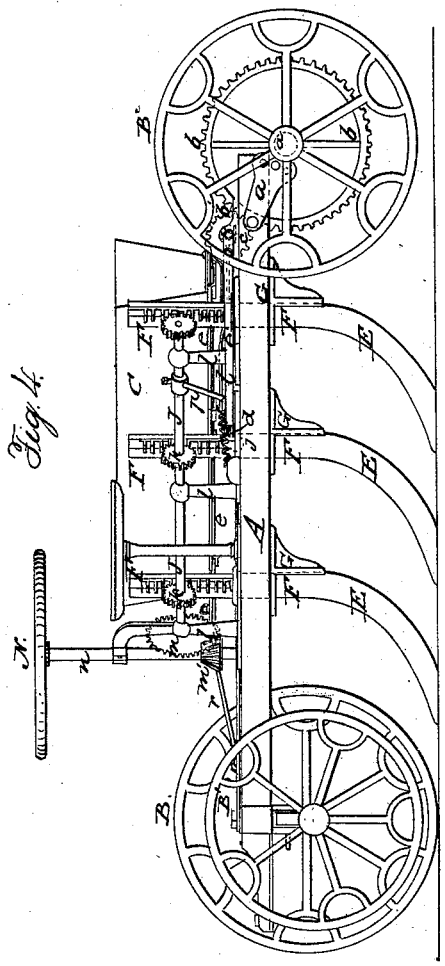

UNITED STATES PATENT OFFICE.

CAMPBELL T. SETTLE, OF SAN JOSÉ, CALIFORNIA.

IMPROVEMENT IN SEEDING-CULTIVATORS.

Specification forming part of Letters Patent No. 31,564, dated February 26, 1861.

*To all whom it may concern:*

Be it known that I, CAMPBELL T. SETTLE, of San José, in the county of Santa Clara and State of California, have invented a Combined Plowing, Seeding, and Harrowing Machine; and I do hereby declare that the following is a full, clear, and exact description thereof, reference being had to the accompanying drawings, making a part of this specification, in which—

Figure 1, Sheet 1, is a plan view of the improved machine with the harrow attached to it. Fig. 2, Sheet 1, is a longitudinal vertical section through the seed-hopper, showing the seed-distributing device. Fig. 3 is a vertical transverse section taken through the seed-hopper. Fig. 4, Sheet 2, is a side elevation of the machine of Fig. 1, Sheet 1, without the harrow attached to it.

Similar letters of reference indicate corresponding parts in all the figures.

This invention combines in one and the same machine the operations of plowing the earth, scattering seed, and harrowing the soil by a novel combination of devices hereinafter to be described.

To enable those skilled in the art to make and use my invention, I will proceed to describe its construction and operation.

In the drawings, A is a triangular framework, supported on three wheels, B B' B², two in front, which are on an axle that is attached to the frame A by a king-bolt in the usual way of connecting the front axle-tree to a vehicle, so that the machine may be turned around easily at the ends of the field. To this front axle-tree the draft-pole is attached. One, B', of the front wheels is smaller in diameter and projects out beyond the side of frame A farther than the wheel B, so that while the wheel B runs on the unplowed ground the wheel B' will run in the furrow and the frame A will be kept horizontal, or nearly so. The rear wheel, B², is equal in its diameter to the wheel B, and this wheel B² runs on the unplowed land. It is keyed to a short shaft, $a$, that has its bearings in arms $a'$ $a'$ projecting out from the rear end of the frame A, which shaft carries a large spur-wheel, $b$, that engages with a pinion spur-wheel, $b'$, on a crank-shaft, $c$, and when the machine is drawn along and the pinion is in gear with the wheel $b$ the crank-shaft is rotated and communicates a reciprocating motion to the seed-slide $e$ through the medium of connecting-rod $c'$ and a vibrating curved rod, $d$, Fig. 1, Sheet 1. The curved rod $d$ has its fulcrum in an arm, $f$, and one end plays in a slotted sector-plate, $g$.

The seeding device is placed in the bottom of a hopper, C, which is arranged at about an angle of thirty degrees with the line of draft, and which rests on two arms, $f f$, that project from the rear part of frame A.

The seed-slide is composed of two thin plates, $e$, of suitable metal, that are clamped together by a thumb-screw that passes through a slot in each plate, so that they must be adjusted one on the other, and by this means the seed-perforations that are in them may be enlarged or reduced at pleasure.

$h$ $h$ $h$, Figs. 2 and 3, Sheet 1, are plates secured transversely across the bottom of the hopper, over which the spaces or seed-perforations in the slide $e$ pass. These cross-plates $h$ cause the seed to drop alternately through the perforations in the slides as they move back and forth. The hopper C is so constructed on its inside that all the seed will be conducted to the perforations in the slides. D is a board hung under the hopper, on which the seeds drop that are to be scattered broadcast. This board spreads the seed uniformly over the soil. The board may be removed for sowing in drills.

The pinion-wheel $b'$ is capable of playing loosely on its shaft in a direction with the length of its shaft, and a bent forked lever, $i$, is so connected with the hub of this wheel $b'$ that by pressing the lever back the wheel $b'$ will be disengaged from the shaft $c$ and the seeding motion will be stopped. A spring, $j$, acts upon lever $i$ and keeps the wheel $b'$ engaged with its shaft $c$ when it is desired to give motion to the seed-slide.

The plows E E E are placed in a gang across the frame A, one preceding the other. These consist simply of a mold-board, point, and share. They have no landside-wing, and consequently the friction occasioned by the landside-wing is obviated. Their standards F each pass up through metal boxes G, (shown in Fig. 1, Sheet 1, and Fig. 4, Sheet 2,) which boxes are bolted to the longitudinal and diagonal beams inside of the frame A. They serve as braces as well as guides for the plow-stand ards, which standards are furnished with rack-teeth on one side, that engage with pinion spur-wheels *k k k*, respectively, which are keyed to a shaft, J, that is supported on three standard-bearings, *l l l*, Fig. 4, Sheet 2. On the right-hand end of the shaft J is a bevel spur-wheel, *m*, which engages with a pinion-wheel, *m'*, on the upright hand-wheel shaft *n*. Now, by rotating the wheel-shaft *n* the pinions will act upon the plow-standards and elevate the plows entirely from the ground, if desired, simultaneously; or by this arrangement the depth for the plows to run in the ground may be regulated to a nicety by the driver while the machine is moving forward. The arm *p* on shaft J is employed to disengage the pinion-wheel *b'* from its shaft *c* by acting upon the bent lever *i* when the plows are elevated free from the surface of the ground.

*r* is a pawl, that may be used to lock the pinion bevel-wheel *m'*, and thus prevent the shaft J from turning in either direction. Attached to the rear end of this frame A by chains *s s* is a harrow, K, which, with the exception of its being made in two parts and jointed or hinged together, is like an ordinary harrow. The jointing of this harrow in the manner shown in Fig. 1, Sheet 1, allows it to accommodate itself to the ridges and unevenness of the surface of the ground over which it is drawn. This harrow pulverizes the soil and covers in the seed scattered from the hopper.

From this description it will be seen that the driver has the means of throwing the gang of plows out of the ground or of regulating the depth they are desired to run in the ground. The driver can also, in raising the plows from the ground, throw the seed-dropping device out of gear, and the machine may thus be transported from place to place without wasting the seed or without plowing up the earth. Then, again, when it is desired to proceed with the work, by lowering the plows the spring *j* will throw the seeding mechanism into gear. In this manner and by the means herein described the driver, who sits in seat N, can control the operation of plowing and scattering seed with very little labor.

Having thus described my invention, what I claim as new, and desire to secure by Letters Patent, is—

The combination, with pinion-shaft J, of the arm *p*, curved lever *i*, and sliding pinion *b'*, the shaft *c*, connecting-rod *c'*, vibrating lever *d*, and seed-slide *e*, arranged and operating substantially in the manner herein set forth.

CAMPBELL T. SETTLE.

Witnesses:
OLIVER COTTLE,
JOHN A. COTTLE.